United States Patent [19]

Ely et al.

[11] Patent Number: 5,017,289
[45] Date of Patent: * May 21, 1991

[54] PROCESS FOR IN SITU BIODEGRADATION OF HYDROCARBON CONTAMINATED SOIL

[75] Inventors: Douglas L. Ely, Novato; David A. Heffner, El Sobrante, both of Calif.

[73] Assignee: Chevron Research & Technology Company, San Francisco, Calif.

[*] Notice: The portion of the term of this patent subsequent to Aug. 23, 2005 has been disclaimed.

[21] Appl. No.: 333,048

[22] Filed: Apr. 3, 1989

Related U.S. Application Data

[63] Continuation of Ser. No. 234,990, Aug. 22, 1988, abandoned, which is a continuation-in-part of Ser. No. 101,358, Sep. 25, 1987, Pat. No. 4,765,902.

[51] Int. Cl.$^5$ .................................................. C02F 3/02
[52] U.S. Cl. ....................... 210/610; 210/620; 210/747; 210/901; 405/128; 405/129; 166/246; 435/264; 435/281
[58] Field of Search ............... 210/610, 611, 620, 747, 210/170, 901; 405/128, 129; 166/311, 246; 435/264, 262, 281

[56] References Cited

U.S. PATENT DOCUMENTS

| 3,616,204 | 10/1971 | Linn | 435/281 |
|---|---|---|---|
| 3,846,290 | 11/1974 | Raymond | 210/610 |
| 4,288,174 | 9/1981 | Laws | 405/129 |
| 4,401,569 | 8/1983 | Jhaveri et al. | 210/610 |
| 4,469,176 | 9/1984 | Zison et al. | 405/129 |
| 4,660,639 | 4/1987 | Visser et al. | 166/267 |
| 4,670,148 | 6/1987 | Schneider | 210/747 |
| 4,713,343 | 12/1987 | Wilson, Jr. et al. | 210/620 |
| 4,730,672 | 3/1988 | Payne | 210/901 |
| 4,765,902 | 8/1988 | Ely et al. | 210/747 |
| 4,842,448 | 6/1989 | Koerner et al. | 405/128 |
| 4,849,360 | 7/1989 | Norris et al. | 435/264 |

OTHER PUBLICATIONS

Minugh et al, "A Case History: cleanup of a subsurface leak of Refined Product," publ. No. 4356, 1983, pp. 397–403.
Thornton et al, "Removal of Gasoline Vapor from Aquifers by Forced Venting," 1984, pp. 279–285.

Primary Examiner—W. Gary Jones
Assistant Examiner—Christopher Upton
Attorney, Agent, or Firm—Burns, Doane, Swecker & Mathis

[57] ABSTRACT

The present invention is a process for in situ biodegradation of spilled hydrocarbons. The process involves drawing oxygen into a hydrocarbon contaminated zone. A borehole is drilled into the contaminated zone and gas is evacuated at high rates out of the borehole to thereby draw oxygen from the earth's surface and through the contaminated zone. Surprisingly, the carbon dioxide concentration in the evacuated gas remains high even at the high flow rates. The rate of gas evacuation in the present process is maintained sufficiently high so that the hydrocarbon biodegradation rate is within at least 50% of the maximum hydrocarbon biodegradation within the zone. The process can be applied to both porous and nonporous soils having relatively low water and gas permeability.

24 Claims, 2 Drawing Sheets

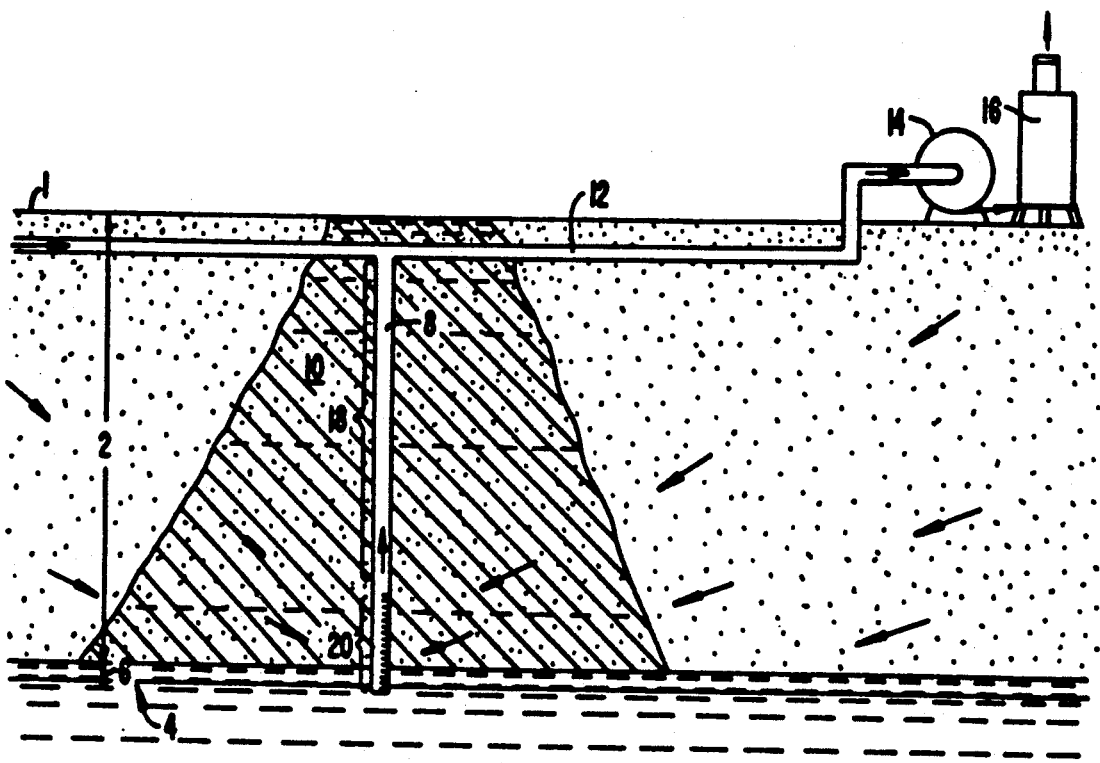
FIG._1.
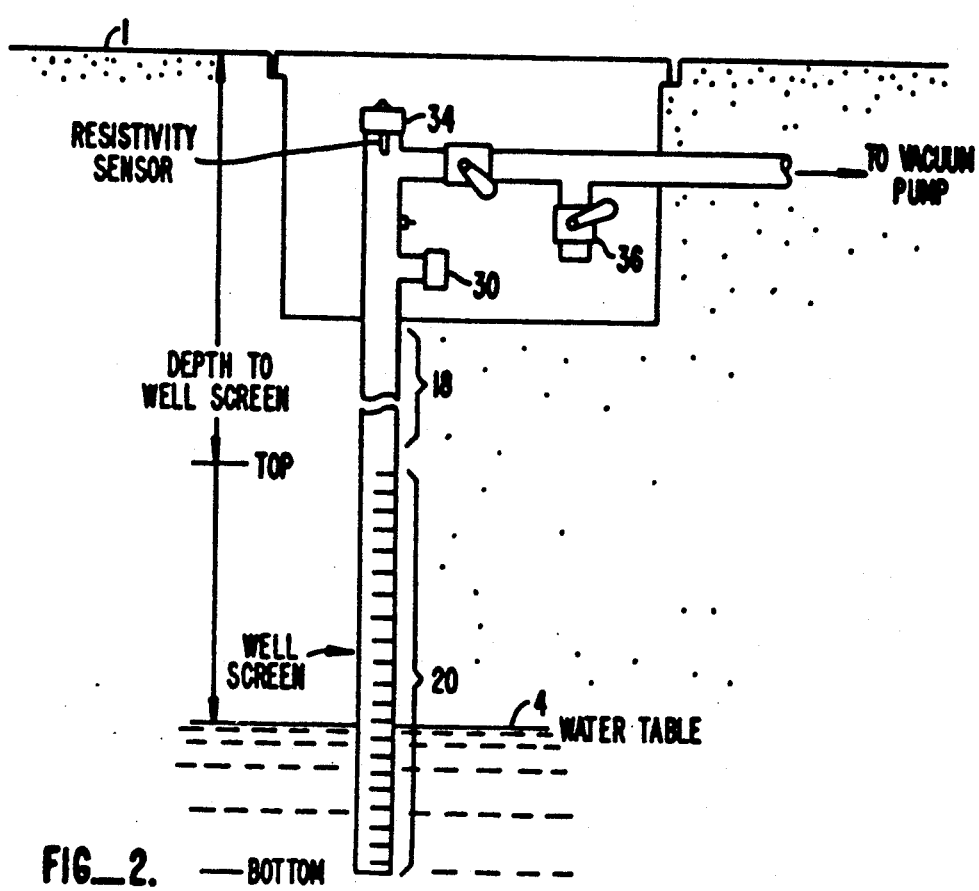
FIG._2.

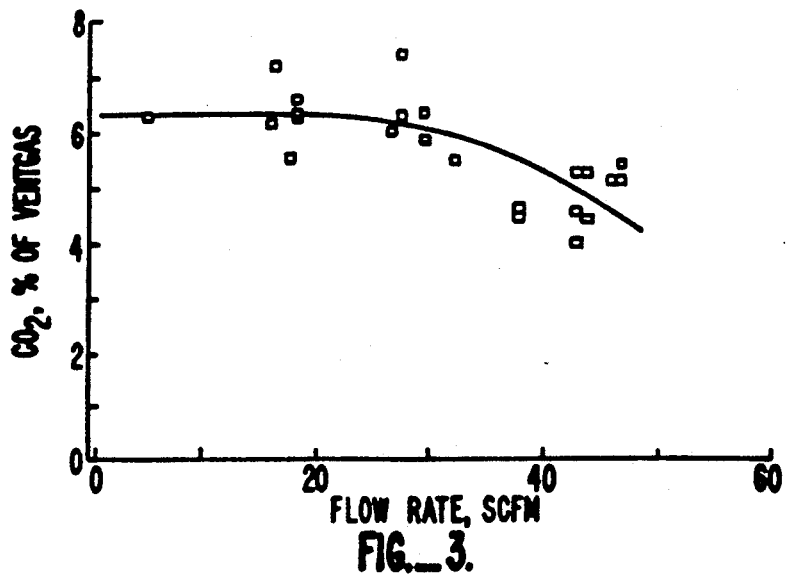
FIG._3.
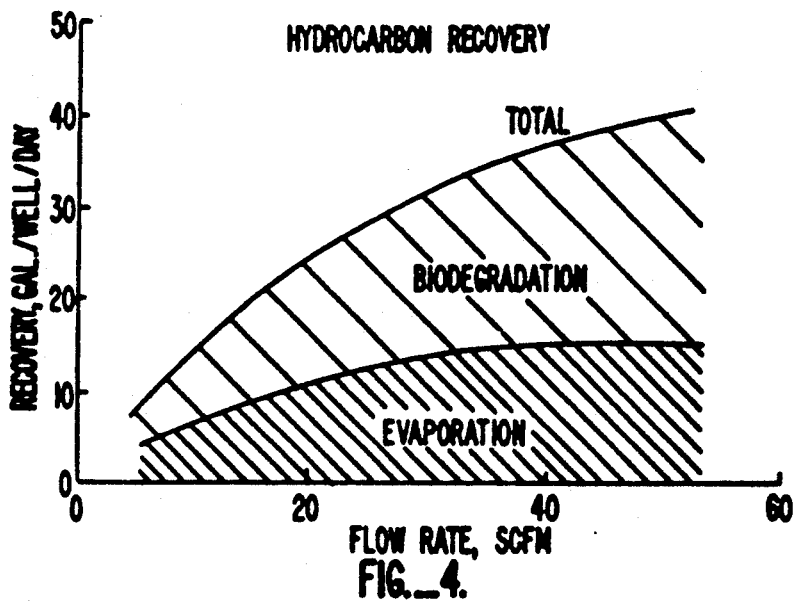
FIG._4.
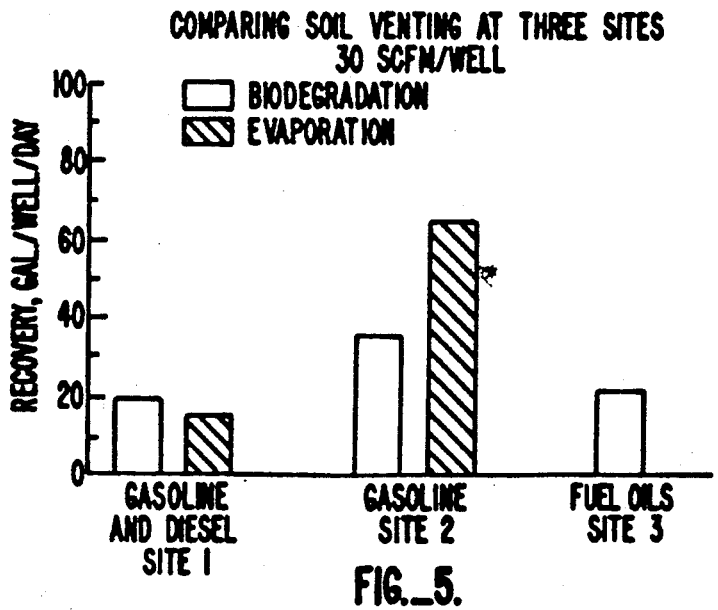
FIG._5.

PROCESS FOR IN SITU BIODEGRADATION OF HYDROCARBON CONTAMINATED SOIL

CROSS REFERENCE TO RELATED APPLICATIONS

This application is a continuation of application Ser. No. 234,990, now abandoned, which is continuation-in-part of application Ser. No. 101,358, filed Sept. 25, 1987, now U.S. Pat. No. 4,765,902.

FIELD OF THE INVENTION

The present invention relates to a process for in situ biodegradation of hydrocarbon contaminated soil. More specifically, the present invention is a process for drawing oxygen into a contaminated zone to stimulate microbial biodegradation of hydrocarbons.

BACKGROUND OF THE INVENTION

Hydrocarbons may contaminate both soil and ground water as a result of accidental spillage from storage tanks or pipes; accidents with transport vehicles; or even by intentional acts such as dumping. Typically, some hydrocarbon biodegradation occurs in the first three feet below the earth's surface. However, that portion of the spill below three feet largely remains in the soil. If the hydrocarbons are not isolated or removed, the spill can spread beyond the original area.

Various procedures have been proposed to address soil and ground water contamination by spilled hydrocarbons. Some systems require physical containment or removal, while others treat the spilled hydrocarbon in place. When the hydrocarbons are treated in place, they may be evaporated or biodegraded under specific conditions.

Underground evaporation of spilled hydrocarbons may be achieved by forced venting. See U.S. Pat. Nos. 4,593,760, issued June 10, 1986 and 4,660,639, issued Apr. 28, 1987, both to Visser et al; 4,183,407, issued Jan. 15, 1980 and 3,980,138, issued Sept. 14, 1976, both to Knopic. However, this process is limited by the vapor pressure of the spilled hydrocarbons and the amount that can be evaporated. Since there is a limit on the amount of hydrocarbon that can be evaporated by venting, there is no incentive to go above that flow rate that provides the maximum evaporation.

Biodegradation has also been disclosed for underground hydrocarbons. U.S. Pat. No. 4,401,569 issued Aug. 30, 1983 to Jhaveri et al discloses a method and apparatus for treating hydrocarbon contaminated ground and ground water. Patentees disclose adding nutrients and gases to water that is flowed through the contaminated soil. A process of this type can be disadvantageous because: the irrigation water washes some hydrocarbons or other contaminants (toxic metal salts, etc.) into the water table; water carries a limited amount of oxygen (8 ppm) into the soil which limits the amount and the rate of degradation that may take place; irrigation can limit biodegradation by physically channeling oxygen-carrying fluids away from the hydrocarbon contaminated (oily) dirt; and, water and oil are immiscible so that biodegradation is limited to water/oil surfaces.

Accordingly, there is the need for a process that will rapidly decontaminate hydrocarbon contaminated soil in an efficient and an environmentally acceptable manner. The need has now been satisfied by the invention that is described below.

SUMMARY OF THE INVENTION

According to the present invention, a process is provided for biodegrading hydrocarbons by drawing oxygen into a hydrocarbon contaminated zone. The process comprises establishing a borehole in a hydrocarbon contaminated zone having hydrocarbon degrading microbes; fluidly connecting a source of negative pressure to the borehole; evacuating gas out of the borehole to draw oxygen through the hydrocarbon contaminated zone; monitoring the evacuated gas; and adjusting the flow rate of oxygen into the hydrocarbon contaminated zone to above the flow rate for maximum hydrocarbon evaporation, whereby a substantial amount of hydrocarbons are biodegraded.

Among other factors, the present invention is based on our finding that an unexpectedly effective process for in situ, underground hydrocarbon biodegradation is provided by drawing atmospheric oxygen into a contaminated zone at high flow rates. Surprisingly, the carbon dioxide concentration in the evacuated gas (as a measure of biodegradation) remains high even at the high flow rates. At the same time, the process is surprisingly advantageous because it also evacuates volatilized hydrocarbon vapor without the danger of detonation. The process is further advantageous over many prior processes because it rapidly biodegrades hydrocarbons in situ without: being limited by their vapor pressure; incurring additional expenses for nutrients, irrigation, etc.; being limited by the equilibrium limits imposed by dissolving $O_2$ and $CO_2$ into irrigation water; or dispersing of hydrocarbons and other contaminants either into the water table or beyond the spill area.

While the instant invention employs a flow rate above the maximum hydrocarbon evaporation flow rate, this maximum hydrocarbon evaporation flow rate is governed primarily by the type of hydrocarbon being evaporated as well as the soil type involved in the contamination and therefore the maximum hydrocarbon evaporation flow rate will vary from site to site. The soil type's role in the maximum hydrocarbon evaporation flowrate results from the surface area of the hydrocarbon in the soil's pores which can be exposed to the oxygen-containing gas flowing to the borehole. In soils, such as clays and, of course, depending on the hydrocarbon being evaporated, the maximum hydrocarbon evaporation flow rate can be less than 5 standard cubic feet per minute (SCFM) per well. In view of the above, as used herein, the term "flow rate for maximum hydrocarbon evaporation" or "maximum hydrocarbon evaporation flow rate" means the flow rate at which no substantial additional amounts of hydrocarbon can be removed by evaporation for that particular hydrocarbon or hydrocarbon mixture and that particular soil type.

As depicted graphically in FIG. 4 which is discussed hereinbelow, the total amount of hydrocarbon evaporated by increasing the gas flow to the bottom of the borehole, asymptotically approaches its theoretical maximum and at a certain point, no substantial additional amounts of hydrocarbon can be practically removed by increasing the gas flow. Accordingly, for the purposes of this application, the term "substantial additional amounts of hydrocarbon" means less than ten percent (10%) and preferably less than five percent (5%) of additional hydrocarbons can be evaporated by increasing the gas flow.

In a preferred embodiment, the present invention comprises establishing a borehole from the earth's surface through a hydrocarbon contaminated zone having hydrocarbon degrading microbes, which borehole terminates in the ground water; establishing a fluid impermeable lining, coaxially spaced and sealingly connected to the inside surface of the borehole, extending from the earth surface to the hydrocarbon-contaminated zone; establishing a fluid permeable lining, coaxially spaced within the inside of the borehole, fixedly connected to, and extending from, the end of the fluid impermeable lining; fluidly connecting a source of negative pressure to the fluid impermeable lining; evacuating gas from the fluid permeable section of the borehole to draw oxygen through the hydrocarbon-contaminated zone; monitoring the oxygen, total hydrocarbon, and carbon dioxide content of the evacuated gas; and adjusting the flow rate of oxygen into the hydrocarbon contaminated zone to achieve within 50% of the maximum hydrocarbon biodegradation and to maintain an oxygen and total hydrocarbon concentration outside the explosive range.

In hydrocarbon contaminated zones where there is a high ground water table and/or the soil type is less porous, the negative pressure necessary to generate the required flow rate may in fact cause the ground water and other fluids, such as hydrocarbons, possibly contained therein or therewith (collectively "ground fluid") to locally be drawn up in the direction of the borehole thereby creating an inverted cone of ground fluid. In the extreme case, the inverted cone of ground fluid can be drawn up the fluid impermeable lining to the earth's surface. Inverted cones of ground fluid are to be avoided because in addition to restricting the flow rate of gases through the hydrocarbon contaminated zones, these inverted cones could in fact spread the hydrocarbon contamination to zones not previously contaminated. Accordingly, in a preferred embodiment, the process of the instant invention includes the additional step of establishing means to remove ground fluid from or at near the bottom of the borehole. Suitable means to remove ground fluid include employing pumps either at the earth's surface or in the borehole, employing vacuum either through the fluid impermeable lining wherein the gases are flowing or via a separate conduit, employing a sufficiently high flow rate of gas to remove ground fluids entrained in aerosols and in some cases employing a siphon. Preferably, the ground fluid is removed by placing a pump at or near the bottom of the borehole and internally in the fluid permeable lining; said pump being fluidly connected to a conduit which leads from the pump to the earth's surface so as to remove the ground fluid. Said conduit is preferably placed within the fluid permeable and impermeable lining and has an external diameter less than the internal diameter of the fluid permeable and impermeable lining. Preferably, the external diameter of the conduit is sufficiently small so as to avoid undue restrictions on the gas flowing through the fluid permeable and impermeable linings. The conduit is made of material sufficiently capable of transporting ground fluid under the operating conditions of the process of this invention without undue wear. Suitable materials include engineered plastics [(such as polyvinylchloride (PVC), polyethylene, etc.] flexible rubber tubing and metals tubing. The major criteria being that the material be stable to the differential pressure between the pressure of the fluids inside the conduit and the pressure inside the fluid permeable and impermeable linings outside the conduit.

The ground fluid so removed may or may not be contaminated with hydrocarbons. If the ground fluid is contaminated with hydrocarbons, then it is preferably placed in holding means for subsequent cleanup. The amount of ground fluid removed should be sufficient to keep the ground fluid substantially level across the hydrocarbon contaminated zone to be treated. In some cases, it may be preferable to remove sufficient ground fluid so as to create a cone of depression in the ground fluid. Such a cone of depression would allow hydrocarbons floating on the ground water to flow into the cone of depression which has the effect of localizing the concentration of liquid hydrocarbons and which can then be removed as part of the ground fluid (creating cones of depressions in ground fluids is well known to environmental and ground water hydrologists). Moreover, since the cone of depression would be near the borehole and therefore near the point of entry of the oxygen-containing gases, hydrocarbons contained in such a cone of depression should be removed, either by evaporation or biodegradation, faster than without such a cone of depression. Most preferably, the amount of ground water removed is that amount which permits optimal gas flow through the borehole.

The pump which removes the ground fluid may be any pump capable of removing ground fluid at the desired rate. Preferably, the pump is a submersible injector pump which can be lowered into the fluid impermeable and permeable lining.

BRIEF DESCRIPTION OF THE DRAWINGS

FIG. 1 is a schematic diagram of an apparatus useful in the present process.

FIG. 2 is a schematic diagram of a well configuration useful in the present invention.

FIG. 3 is a graph showing the relationship between flow rate and $CO_2\%$ in the evacuated air for site 1.

FIG. 4 is a graph showing the total hydrocarbon recovery for site 1.

FIG. 5 is a graph comparing the biodegradation and evaporation for sites 1, 2, and 3.

DETAILED DESCRIPTION OF THE INVENTION

The present invention is useful for in situ biodegradation of hydrocarbon contaminated soil. The term hydrocarbon includes organic molecules that are commonly found in oil, such as aromatics, alkanes, olefins, various complex heterocyclic molecules, and various derivatives of these molecules, such as alcohols, esters, ketones, carbonates, acids, some halogenated compounds, complex heterogeneous hydrocarbon molecules, as well as the more specific decomposable compounds listed in Amdurer et al, Systems to Accelerate In Situ Stabilization of Waste Deposits (Report No. EPA/540/2-86/002) which is hereby incorporated by reference in its entirety. However, the term hydrocarbon only includes those compounds which are biodegradable and which reach their maximum evaporation point before their maximum biodegradation point. These hydrocarbons typically have vapor pressures less than 2 psia at 25° C. Reference will now be made to FIG. 1 to provide an example of the present process.

A hydrocarbon contaminated zone 10 can be contained within a vadose zone 2. The vadose zone 2 is defined by the earth's surface 1 and the ground water level 4. There is also a capillary zone 6 just above the ground water level 4 where oil can be supported on soil capillaries in top of the water. It is contemplated that hydrocarbons are biodegraded when they are in the hydrocarbon contaminated zone 10, the capillary zone 6, or are washed into either two zones by the rise and fall of the ground water.

As shown in FIG. 1, a borehole 8 is established in the hydrocarbon contaminated zone 10. The borehole 8 essentially extends from the earth's surface 1 and provides vapor access to the contaminated zone 10. The borehole 8 can extend into the hydrocarbon contaminated zone 10, the capillary zone 6, or preferably further downward below the ground water level 4.

The borehole 8 preferably includes a fluid impermeable lining 18 and a fluid permeable lining 20. The fluid impermeable lining 18 is preferably positioned within the borehole 8, typically adjacent to the earth's surface 1. The fluid permeable lining 20 is also preferably positioned within the borehole 8, but in a position that ensures oxygen flow through the hydrocarbon contaminated zone 10. A gas exhaust line 12 is fluidly connected to the borehole 8 at the earth's surface 1 (which includes a submerged connection as shown in FIGS. 1 and 2) and then to a vacuum source 14 and a gas processing means 16. The vacuum source 14 creates negative pressure to draw oxygen into the hydrocarbon contaminated zone 10 along the flow lines shown by the arrows in FIG. 1. Starting from the vacuum source 14, the gas is evacuated in this sequence, through the: vapor carrying line 12; the fluid impermeable lining 18; the fluid permeable lining 20; the hydrocarbon contaminated zone 10; the vadose zone 2; and the earth's surface 1. Gas exhaust line 12 can be fluidly connected to a single borehole 8 or multiple boreholes (not shown).

The evacuated gas is preferably monitored for the flow rate, the oxygen concentration, the total hydrocarbon concentration, and the carbon dioxide concentration. Monitoring equipment for these purposes are known in the art. However, an example of a monitoring system is shown in FIG. 2. Flow rates can be measured by inserting a device such as an anemometer into a flow measurement port 30. Total hydrocarbon concentration can be measured by a system which includes a multimeter with a resistivity sensor, both of which can be attached to a well cap 34. A total organic analyzer (e.g., Model 401 manufactured by Byron Instruments) can also be used to determine the hydrocarbon and $CO_2$ concentrations. Oxygen and carbon dioxide concentrations can be measured by sampling the evacuated gas through sampling port 36 and passing the sample to an oxygen analyzer such as Model 320p-4 manufactured by Teledyne Analytical Instruments.

In the process of the present invention, the flow rate of the evacuated gas is adjusted to achieve the objective of a rapid and high amount of hydrocarbon biodegradation. Additionally, it is an objective to insure that the mixture of oxygen and hydrocarbon vapor in the evacuated gas is outside the explosive range. We have discovered that the first objective is achieved at surprisingly high flow rates and the second objective is achieved by adjusting the concentrations of oxygen and hydrocarbon vapors at these high flow rates. The flow rates (per borehole) in the process of the present invention are preferably above the flow rate for maximum evaporation of the hydrocarbon that is to be biodegraded; preferably in certain porous soils, the flow rates per well are between 30 and 250 SCFM and in non-porous soils, such as clays, the flow rates per well can be as low as 5 SCFM and preferably greater than 5 SCFM and more preferably between 5 and 75 SCFM; most preferably, the flow rates are adjusted to achieve within 50% of the maximum hydrocarbon biodegradation.

As used herein, the term "non-porous soils" means soils which have a permeability to water below $10^{-5}$ cm/sec and includes soil types, such as clays, silts, fractured rocks, etc.; whereas "porous soils" mean soils which a permeability to water greater than $10^{-5}$ cm/sec and includes soils types such as sands, sandy loams, gravel, etc.

Hydrocarbons can be removed by several mechanisms at these high flow rates. They are: evaporation; biodegradation; and by the creation of a hydrocarbon aerosol. Some hydrocarbons are removed by evaporation when gas is drawn out of the borehole 8 and oxygen is drawn through the hydrocarbon contaminated zone 10. For biodegradable hydrocarbons this evaporation typically increases as the flow rate increases, but will asymptotically approach its theoretical maximum and at a certain point, no substantial additional amounts of hydrocarbon can be practically removed by increasing the airflow. In hydrocarbon evaporation systems it is unnecessary and inefficient to increase the flow rate above this point because no substantial additional amounts of hydrocarbon will be evaporated. For purposes of the present invention it is preferable to go beyond that level to reach high hydrocarbon biodegradation rates. Surprisingly, biodegradation occurs at the high flow rates beyond the point of maximum evaporation. Understandably, these high biodegradation rates increase as the flow rate increases, but stop increasing at some flow rate, depending on the hydrocarbon and the soil conditions (i.e., depth, permeability, etc.). The hydrocarbons can also be removed by the third mechanism; the creation of a hydrocarbon aerosol. These aerosols can form due to very high flow rates or a large pressure drop across the fluid permeable lining 20. Depending on the hydrocarbon and the particularities of the hydrocarbon contaminated zone 10, it may be desirable to increase the flow rates to remove hydrocarbons by this additional method.

It is preferable to achieve the maximum hydrocarbon biodegradation that is possible. For measurement purposes, hydrocarbon biodegradation is assumed to be equal to $CO_2$ removal because the hydrocarbons are converted to $CO_2$ (even though some hydrocarbons are initially incorporated into biomass). To calculate the maximum hydrocarbon biodegradation rate, the evacuated gas is monitored for $CO_2$ concentration. Then $CO_2$ removed per unit time is calculated from the flow rate and $CO_2$ concentration. Flow rate is increased until the total $CO_2$ removed no longer increases. At the flow rates of the present invention the $CO_2$ concentration in the evacuated gas is preferably between 1 and 14%, more preferably between 6 and 14%.

Also, the oxygen and total hydrocarbon concentrations are monitored and are adjusted to outside the explosive range. Preferably, the $O_2$ concentration is limited to below 10% to reduce the possibility of explosion when the total hydrocarbon vapor is above 1%. However, this oxygen limit may be exceeded if it is preferred to increase the flow rate. When the oxygen concentration is equal to or greater than 10%, diluent gas is preferably introduced into the evacuated gas to reduce the total hydrocarbon concentration to below the lower explosive limit.

The present invention is operable on virtually all varieties of biodegradable hydrocarbons within the boiling range of 90° to 1500° F. at atmospheric pressure. This includes: heavy oils, such as asphalt, gas oils, or fuel oils; and light oils, such as gasoline, jet fuel, diesel, turbine fuels, or light gas oils, as well as the compounds listed in Amdurer et al. The process is not limited by low hydrocarbon vapor pressures. Some biodegradable inorganics might also be biodegraded, such as sulfides, phosphorus, and nitrogen compounds.

Additionally, the process can be operable on a variety of soils. Examples are: sands; coral; fissured volcanic rock; carbonaceous deposits (i.e., limestone); gravel; silts; clays; and mixtures thereof. More densely packed soil can decrease the oxygen transport as well as the flow rate and can require closer well spacing when multiple wells are used. However, the present process will continue to be effective in such more densely packed soils because oxygen will contact the microbes, either by convection or by diffusion, to stimulate hydrocarbon biodegradation and further because the lower gas flow rates will still be above the maximum hydrocarbon evaporation flow rate for these soils.

The microbes that biodegrade hydrocarbons are typically bacteria. Many bacterial genuses adapt to this task and are known to those skilled in microbiology. Representative bacteria include gram-negative rods such as: Pseudomonas; Flavobacterium; Alcaligenes; and Achromobacter; or gram-positive rods and cocci such as: Brevibacterium; Corynebacterium; Arthrobacter; Bacillus; and Micrococcus; and others such as Mycobacterium; Nocardia; and Streptomyces. These bacteria are preferably indigenous although they may be added to the hydrocarbon contaminated zone 10. Other hydrocarbon degrading microbes are fungi, algae, actinomycetes, etc. (see also Appendix A of Amdurer et al.).

The borehole 8 is another feature of the present invention. Preferably, the diameter of the borehole is between 8 and 40 inches, more preferably between 12 and 32 inches. Preferably, the borehole 8 extends into the hydrocarbon contaminated zone 10. In some instances it is preferable to extend the borehole 8 into the capillary zone 6 just above the ground water level 4 or even below the ground water level 4. Preferably, a lower depth ensures that air is drawn along the capillary zone irrespective of the fluctuations in the ground water level.

The borehole 8 can be drilled to absolute depths in excess of 150 feet. For a deeper borehole a higher flow rate is typically required for more biodegradation. The borehole 8 can be vertical, diagonal, or laterally oriented and can be drilled into the hydrocarbon contaminated zone 10 by any well drilling method known in the art that is suitable for penetrating the particular contaminated soil. Also, if it is preferable to laterally vent a contaminated zone, a trench may be excavated, a fluid permeable lining inserted into the trench, and then the soil back filled over the lining. However, care should be taken not to use a method that would reduce the permeability of the soil around the fluid permeable lining 20 of the borehole 8, i.e., by compaction or by using too much drilling muds or fluids.

Typically, the fluid impermeable lining 18 is coaxially spaced within the borehole 8. The lining 18 has an internal diameter between 2 and 16 inches, more preferably between 2 and 12 inches. This lining 18 may be well casing or a conduit which is smaller in diameter than the borehole 8. Preferably, a portion of the fluid impermeable lining 18 at the earth's surface 1 (or a minor depth below the surface) is sealed off and attached to the vacuum source 14. A fluid permeable lining 20 is coaxially positioned at the end of fluid impermeable lining 18. This lining 20 may be well casing having holes, screens, or other means to permit a gas, an aerosol, or liquid flow therethrough. Preferably, both linings 18 and 20 are substantially the same diameter. It is intended that both linings direct the vacuum induced air flow through the hydrocarbon contaminated zone 10. To achieve this goal, air infiltration between the lining 18 and the borehole 8 is preferably minimized. To prevent air from being drawn down from the earth's surface and along the lining 18, a low permeability material is preferably inserted between the lining 18 and the borehole 8. Preferably, this material is compacted soil, clay, grout, or cement.

Additionally, the pressure drop between the fluid permeable lining 20 and the borehole 8 can be adjusted. A higher pressure drop is preferable because high flow rates of this invention can form aerosols of hydrocarbons or contaminated water. The aerosol is carried out of the borehole with the evacuated gas thereby increasing contaminant removal. In this instance it is not necessary to provide a fill material for the lining 20. However, if a low pressure drop is preferred, then the space defined by the borehole 8 and the outer diameter of the fluid permeable lining 20 can be packed with a loose fluid permeable material, such as gravel, sand, or crushed rock. This material prevents fine particles, such as silts, from plugging the fluid permeable lining 20.

The particular characteristics of the contaminated area may suggest that one or more boreholes be established to carry out the present process. Some relevant factors for this determination are: the amount of spilled hydrocarbon; the depth of the hydrocarbon contaminated zone 10; the type of soil; the ground water level 4, etc. If multiple boreholes are necessary, then they are preferably spaced between and 5 and 300 feet apart. Preferably, these boreholes are all vacuum wells although air inlet wells can be used for deeper hydrocarbon contaminated zones 10.

The vacuum source 14 evacuates gas through the fluid permeable lining 20 and passes this evacuated gas to the processing means 16. The vacuum source 14 may be any means capable of establishing negative pressure within the borehole to cause a flow of oxygen through the hydrocarbon contaminated zone 10. Preferably, the vacuum source 14 is a pump or an aspirator (see Knopic, U.S. Pat. No. 3,980,163). Preferable pumps are rotary and liquid ring pumps. Exemplary liquid ring pumps are manufactured by Sullair and Nash, and have a capacity to pull between 70 and 2500 SCFM and preferably between 110 and 2500 SCFM. Preferably, these pumps have a capacity to pull either at least 30 SCFM through porous soil from at least one borehole, preferably multiple boreholes, or at least 5 SCFM through non-porous soils from at least one borehole, preferably multiple boreholes. Preferably, they have a means for flame suppression to prevent explosions. The processing means 16 may comprise a means to vent the evacuated gas to the atmosphere, a means for filtering the gas, a means for compressing the evacuated gas, or a means for incinerating the evacuated gas. The evacuated gas contains: oxygen, carbon dioxide as a biodegradation product, water vapor, and hydrocarbon vapor due to evaporation. These components of the evacuated gas may be useful for a variety of purposes outside of the present invention. For example, the high amount of $CO_2$ that is produced by this process can be recovered and used in tertiary oil recovery or used as a refrigerant. The hydrocarbon vapor can be recovered and further refined or sold.

A variety of other factors contribute to the efficiency of the present invention. For example, the soil temperature, the soil humidity, the nutrients, and the pH are all variables that affect the growth of the microbial population. The soil temperature is difficult to regulate, but temperatures above 50° F. are preferable to promote microbiological growth. Additionally, humidity is preferable to foster growth. Water may be introduced into the air that is flowed through the hydrocarbon contaminated zone 10 by irrigation or steam injection, for example. Additionally, organic and inorganic nutrients are essential to microbial growth may be added to the hydrocarbon-contaminated zone 10 by means known in the art. These nutrients can be alkali metals (such as potassium), phosphates, and nitrates. Furthermore, pH may be manipulated by the addition of basic or acidic compounds if it is incompatible with microbial growth.

The present invention will be more fully understood by reference to the following examples. They are intended to be purely exemplary and are not intended to limit the scope of the invention in any way.

EXAMPLES

Tests were conducted on systems installed at four sites where various oil products had been spilled in soil and ground water. The systems had different depths to the top and bottom of the fluid permeable lining 20 (well screen) and each site involved different hydrocarbon contaminants as shown below:

| Site | Type of Oil | Depths to the Top and Bottom of the Well Screen |
|---|---|---|
| 1 | 70% gasoline 30% diesel | 15 to 30 feet |
| 2 | gasoline blending component | 130 to 145 feet |
| 3 | heavy fuel oil | 10 to 90 feet |
| 4 | asphalt diluted with kerosene | 4 to 15 feet |

The tests are described below in each of the examples. In each example no nutrients (fertilizers) or bacteria were added to the sites to stimulate biodegradation. Soil moisture was not increased by irrigation above normal levels.

EXAMPLE 1

Six test wells were drilled near 10 existing wells. Each borehole had an internal diameter of 4 inches and an outside diameter of 8 inches. PVC pipe was used as a fluid impermeable lining and a PVC screen was used as a fluid permeable lining. The soil was sandy loam. After evacuating and testing, gas from the borehole was subsequently incinerated.

The soil around the spill had been vented for about two years to control migration of oil vapors into nearby buildings. The venting rate for those two years was below 30 standard cubic feet per minute (SCFM) per well.

In the test the vented gas was kept below the lower flammability limit (1% oil vapor) by diluting it near the well head with air. An example of the undiluted vent gas had the following composition:

| Well Flow SCFM | $CO_2$ | $O_2$ | Oil Vapor | Methane |
|---|---|---|---|---|
| 30 | 7.5% | 8.5% | 1% | 0% |

The atmospheric oxygen that was pulled into the ground stimulated significant biodegradation. There was enough biodegradation to deplete the oxygen concentration to below 10% and to make the vented gas non-flammable regardless of the oil vapor concentration. The lack of methane indicated insignificant anaerobic biodegradation.

The flow rate of the evacuated air was increased in steps and held constant for several days between each step, then samples of gas were analyzed for oil vapor and $CO_2$ concentration. The $CO_2$ levels remained nearly constant until the flow was increased above 30 SCFM, then it declined slowly as shown in FIG. 3. The $CO_2$ and $O_2$ concentrations were sustained throughout several months of tests which indicated that biodegradation was not temporary or limited by soil moisture or nutrients. The oil biodegradation rate was calculated by assuming that oil was converted directly into $CO_2$ (which is conservative since as much as half of the oil is initially converted to biomass). Total removal rate was the sum of the biodegradation and evaporation rates as shown in FIG. 4. FIG. 4 shows that biodegradation increases even after the evaporation rate has reached a plateau.

EXAMPLE 2

The carbon dioxide, oxygen, and total hydrocarbon concentrations were measured as in Example 1 and a well outside the spill area was monitored to determine the background levels for each of these components. These wells were drilled as in Example 1. At 30 SCFM the following data was generated for both wells:

| Site | Well Flow in SCFM | $CO_2$ | $O_2$ | Oil Vapor | Methane |
|---|---|---|---|---|---|
| Spill Area | 30 | 11% | 2.3% | 4.9% | 1.3% |
| Background (Non-Spill) | 30 | 1.0% | 18.3% | 0% | 0% |

The flow rate was increased to 180 SCFM which increased the biodegradation. At this flow rate, the gas velocity was high enough to create an aerosol of liquid gasoline and water droplets which indicated that the invention can be designed to also remove some liquids.

EXAMPLE 3

This example shows the biodegradation of heavy fuel oil.

At Site 3 the carbon dioxide, oxygen, and total hydrocarbon concentrations were monitored. The following data was collected:

| Well Flow in SCFM | $CO_2$ | $O_2$ | Heavy Fuel Oil Vapor | Methane |
|---|---|---|---|---|
| 30 | 6.8% | 11% | 0% | 2.3% |

Evaporation of the heavy oil was negligible due to its low volatility. Venting at low flow rates would be ineffective in removing heavy, non-volatile oil spills.

FIG. 5 compares the removal rates at Sites 1, 2 and 3. FIG. 5 shows that the process of the present invention is useful to remove a broad range of hydrocarbon contaminants from soil and various depths. Furthermore, the oxygen and oil vapor concentrations can be controlled to safely operate outside of the explosive limits.

EXAMPLE 4

One test well was drilled into a non-porous soil (clay). The borehole had an internal diameter of 12 inches. PVC pipe was used as a fluid impermeable lining and a PVC screen was used as a fluid permeable lining. The clay had a water permeability of from $10^{-5}$ to $10^{-6}$ cm/sec. After evacuating and testing, gas from the borehole was subsequently treated with activated carbon.

When necessary, the vented gas can be kept below the lower flammability limit (1% oil vapor) by diluting it near the wellhead with air. Examples of undiluted vent gas had the following $CO_2$ content under the following process conditions:

|        | Vacuum (inches of water) | Flow per well | $CO_2$ (volume %) | Estimated Oil Biodegradation (Gal/day/well) |
|--------|---|---|---|---|
| Case 1 | 120 | 9 SCFM  | 8.5% | 5 |
| Case 2 | 120 | 14 SCFM | 6%   | 5 |
| Case 3 | 180 | 25 SCFM | 5%   | 8 |
| Case 4 | 180 | 31 SCFM | 5%   | 10 |

In this example, the hydrocarbon content was sufficiently low so as to allow oxygen concentration at levels of approximately 17 volume percent. This example demonstrates the operability of the process of this invention on non-porous soils contaminated with hydrocarbons.

The foregoing disclosure has taught some specific examples of the present invention. However, there are many modifications and variations within the spirit of the disclosure. It is intended that the embodiments are only illustrative and not restrictive.

What is claimed is:

1. An in situ process for biodegrading hydrocarbons by drawing oxygen into an undisturbed hydrocarbon contaminated zone in a fluid permeable soil, comprising:
    establishing a borehole extending from the earth's surface through a hydrocarbon contaminated zone having hydrocarbon degrading microbes therein;
    lining said borehole with a fluid impermeable liner coaxially spaced and sealingly connected to the inside surface of said borehole and extending from the earth's surface to the hydrocarbon-contaminated zone;
    said liner including a fluid permeable portion extending from the lower end thereof and through at least a portion of said hydrocarbon contaminated zone,
    fluidly connecting a source of negative pressure to said fluid impermeable liner;
    evacuating gas from said borehole through the fluid permeable portion of said liner at a rate sufficient to draw air from the earth's surface into the hydrocarbon containing zone; and
    adjusting the flow rate of the evacuated gas so that the amount of hydrocarbon biodegradation therein is within 50% of the maximum hydrocarbon biodegradation rate as detected by the volume of carbon dioxide in the evacuated gas.

2. A process in accordance with claim 1 wherein the flow rate is between 30 and 250 SCFM per well.

3. A process in accordance with claim 1 wherein the borehole extends into a capillary zone.

4. A process in accordance with claim 1 wherein the borehole extends into the ground fluid.

5. A process in accordance with claim 1 further comprising establishing multiple boreholes which are spaced between 5 and 300 feet apart from each other.

6. A process in accordance with claim 1 further comprising monitoring the water content of the evacuated gas.

7. A process in accordance with claim 1 further comprising adding nutrients which promote bacterial growth in the hydrocarbon contaminated zone, said nutrients being selected from the group of phosphates, nitrates, or alkali metals.

8. A process in accordance with claim 1 further comprising removing hydrocarbons by creating an aerosol.

9. A process in accordance with claim 1 further comprising removing ground fluid from the borehole.

10. An in situ process for biodegrading hydrocarbons by drawing oxygen into a physically undisturbed hydrocarbon contaminated zone of a soil having a fluid permeability of less than about $10^{-5}$ cm/sec, comprising:
    establishing a borehole from the earth's surface, through a hydrocarbon contaminated zone having hydrocarbon degrading microbes;
    establishing a fluid impermeable lining, coaxially spaced and sealingly connected to the inside surface of the borehole, extending from the earth's surface to the hydrocarbon-contaminated zone;
    establishing a fluid permeable lining, coaxially spaced within the inside of the borehole, fixedly connected to, and extending from, the end of the fluid impermeable lining;
    fluidly connecting a source of negative pressure to the fluid impermeable lining;
    evacuating gas from the fluid permeable lining to draw oxygen into the hydrocarbon-contaminated zone; and
    adjusting the flow rate so that the amount of hydrocarbon biodegradation therein is within 50% of the maximum hydrocarbon biodegradation rate as detected by the volume of carbon dioxide in the evacuated gas.

11. A process in accordance with claim 10 wherein the flow rate is between 5 and 75 SCFM per well.

12. A process in accordance with claim 10 wherein the borehole extends into a liquid capillary portion of said zone.

13. A process in accordance with claim 10 wherein the borehole extends into the ground fluid.

14. A process in accordance with claim 10 further comprising establishing multiple boreholes which are spaced between 5 and 300 feet apart from each other.

15. A process in accordance with claim 10 further comprising monitoring the water content of the evacuated gas.

16. A process in accordance with claim 10 further comprising adding nutrients to promote bacterial growth in the hydrocarbon contaminated zone, said nutrients being selected from the group consisting of phosphates, nitrates, or alkali metals.

17. A process in accordance with claim 10 further comprising removing hydrocarbons by creating an aerosol.

18. In a process for in situ decontamination of soil or ground water containing hydrocarbon material wherein a borehole extends from the earth's surface into a hydrocarbon contaminated zone, said borehole including a fluid impermeable casing sealed to the sidewall thereof from the earth's surface to a selected depth within said zone traversed by said borehole, fluid passageway means communicating between the fluid space within the lower end of said casing and said zone at said selected depth, and gas pumping means sealingly connected to said casing for drawing air from the earth's surface through said zone to entrain at least the volatile hydrocarbon components in said zone for flow into said fluid space through said fluid permeable passageways by pumping fluid vapor from the upper end of said casing to thereby extract at least the volatile components of said hydrocarbon material from said zone, the improvement comprising;

increasing the rate of fluid vapor pumping through said casing from said contaminated zone in an amount and to an extent sufficient to promote the production of carbon dioxide in the recovered fluid vapor from said zone to a concentration above a background level of carbon dioxide generation in said zone, said concentration of carbon dioxide being a minimum of 1% by volume, as a measure of the rate of biodegradation of said hydrocarbon material by hydrocarbon degrading microbes in said zone.

19. A process in accordance with claim 18 wherein said fluid vapor pumping rate is from 5 SCFM to 250 SCFM.

20. A process in accordance with claim 18 wherein said carbon dioxide content is continuously monitored.

21. A process in accordance with claim 20 wherein hydrocarbon content and oxygen content of said fluid vapor are monitored in relation to said carbon dioxide content to confirm that the rate of biodegradation of hydrocarbon components in said zone is above said background carbon dioxide content of said zone.

22. A process in accordance with claim 18 wherein the concentration of carbon dioxide in the recovered fluid vapor is from 1% by volume to 14% by volume.

23. A process in accordance with claim 22 wherein said concentration of carbon dioxide is from 6% by volume to 14% by volume.

24. A process in accordance with claim 18 wherein the hydrocarbon material in said contaminated zone includes hydrocarbon components having a low volatility for evaporation thereof at ambient temperatures and pressures in said zone.

* * * * *